United States Patent [19]
Larkin et al.

[11] 3,933,741
[45] Jan. 20, 1976

[54] STABILIZED VINYL CHLORIDE POLYMER COMPOSITIONS

[75] Inventors: William A. Larkin, Morristown; Robert C. Ringwood, Jr., Sewaren, both of N.J.

[73] Assignee: M & T Chemicals Inc., Greenwich, Conn.

[22] Filed: Sept. 17, 1974

[21] Appl. No.: 506,708

Related U.S. Application Data

[63] Continuation-in-part of Ser. No. 290,994, Sept. 20, 1972, abandoned, which is a continuation-in-part of Ser. No. 732,027, May 27, 1968, abandoned.

[52] U.S. Cl. ... 260/45.75 S; 252/406; 260/45.75 H; 260/45.75 T
[51] Int. Cl.² ............................................ C08J 3/20
[58] Field of Search ............... 260/45.75 S; 252/406

[56] References Cited
UNITED STATES PATENTS

| | | | |
|---|---|---|---|
| 3,398,114 | 8/1968 | Pollock | 260/45.75 |
| 3,413,264 | 11/1968 | Hechenbleikner | 260/45.75 |
| 3,534,121 | 10/1970 | Eggensperger et al. | 260/45.75 |
| 3,562,305 | 2/1971 | Hoch | 260/45.75 |
| 3,640,950 | 2/1972 | Weisfeld | 260/45.75 |

*Primary Examiner*—V. P. Hoke
*Attorney, Agent, or Firm*—Robert P. Auber; Kenneth G. Wheeless; Robert Spector

[57] ABSTRACT

The heat stability imparted to vinyl polymers by a given concentration of certain sulfur-containing organotin compounds is not adversely affected with respect to either long term stability or delay in appearance of initial discoloration when a portion of the sulfur-containing organotin compound is replaced by certain less effective organotin stabilizers, including tetraorganotin compounds and diorganotin carboxylates.

6 Claims, No Drawings

STABILIZED VINYL CHLORIDE POLYMER COMPOSITIONS

BACKGROUND

This application is a continuation-in-part of application, Ser. No. 290,994, filed Sept. 20, 1972 now abandoned which in turn is a continuation-in-part of application, Ser. No. 732,027, filed May 27, 1968 and now abandoned, This invention relates to a method for improving the efficiency of certain sulfur-containing organotin compounds as stabilizers for polyvinyl chloride and to the resultant stabilized vinyl chloride polymer compositions.

As is well known to those skilled-in-the art, various halogen-containing organic polymers, particularly vinyl chloride homopolymers and copolymers, may degrade when heated over extended periods of time. The degradation is evidenced by a darkening of the resin, and by an increase in brittleness. These defects may render the resin unsuitable for many uses since the heat-induced discoloration produces an unsightly appearance, and the increased brittleness may cause premature mechanical failures. A wide variety of materials has heretobefore been employed to stabilize halogen-containing polymers. Many of these additives have achieved some measure of success in stabilizing halogen-containing resins against the degradative action of heat, but there are many applications in which a greater degree of heat stability is desired than has heretofore been readily attainable.

Many prior art stabilizing systems may not fully prevent the deterioration of resins or polymers including polyvinyl chloride during the period when the resins and stabilizer compositions are maintained on the hot mill on which they are blended. During this period, which is between 5 and 30 minutes or longer, the various ingredients including any pigments, plasticizers, stabilizers and lubricants, are mixed with the resin and the mixture is subjected to the influence of heat and pressure to form a substantially homogeneous composition. During this period of severe heating (typically at 175°C. or higher), the resin may discolor much more quickly than under normal processing or handling conditions. Thus, the product coming from the Banbury Mill-Blender or extruder may be darker than is desirable.

Sulfur-containing organotin compounds such as organotin mercaptides and derivatives of mercaptocarboxylic acids and ester such as di-n-butyltin-S,S'-bis-(isooctyl mercaptoacetate) effectively stabilize vinyl chloride polymers for relatively long periods of time; however, these compounds are expensive, and considerably increase the cost of the stabilized resin composition. In addition, these compounds may impart an objectionable odor to the resin composition when employed at concentration levels sufficient to achieve the desired degree of heat stabilization. The odor is particularly noticeable when the compounds are heated as required during a milling or shaping operation.

It has now been found that the concentration of sulfur-containing organotin compound required to impart a given level of heat stability to polymers derived at least in part from vinyl chloride can be decreased by up to 50% or more by replacing a portion of the sulfur-containing organotin compound with organotin compounds which, when employed alone, are relatively poor heat stabilizers for vinyl chloride polymers. Many of these poor stabilizers are considerably less expensive than the more efficacious sulfur-containing organotin compounds. Surprisingly, it has been found that the addition of some relatively poor heat stabilizers to the organotin mercaptide or mercaptocarboxylate in some instances even delays the development of the initial discoloration when the polymer composition is exposed to elevated temperatures.

SUMMARY OF THE INVENTION

This invention provides two-component heat stabilizers for homopolymers of vinyl chloride and copolymers containing repeating units derived from vinyl chloride and at least one ethylenically unsaturated compound which is copolymerizable with vinyl chloride, said stabilizers consisting essentially of 1) a sulfur-containing organotin compound exhibiting a generic formula selected from the group consisting of:

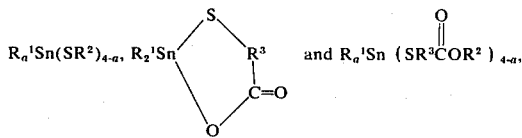

$R^1$ and $R^2$ being individually selected from the group consisting of alkyl radicals containing between 1 and 20 carbon atoms, cycloalkyl, aryl, alkaryl, and aralkyl hydrocarbon radicals, $R^3$ being a methylene or an ethylene radical and $a$ representing the integer 1 or 2, and 2) between 20 and 80%, based on the weight of the total stabilizer of a second organotin compound exhibiting a generic formula selected from the group consisting of $R_2^4 R_2^5 Sn$, $R_3^4 R^5 Sn$, $R_b^4 Sn(OCR^5)_{4-b}$.

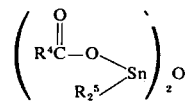

and $R_b^4Sn(OCCH=CHCOR^5)_{4-b}$, wherein $R^4$ and $R^5$ are different when directly bonded to the same tin atom and are individually selected from the same group as $R^1$ and $R^2$ and $b$ is an integer between 1 and 3, inclusive.

DETAILED DESCRIPTION OF THE INVENTION

The improved organotin stabilizers of this invention can be incorporated into polymer compositions wherein the sole or major polymeric component is a homopolymer of vinyl chloride or a copolymer of vinyl chloride with one or more copolymerizable ethylenically unsaturated compounds. Suitable comonomers include acrylic and methacrylic acids and derivatives thereof, such as ethyl acrylate and acrylonitrile; vinyl monomers such as styrene and vinyl acetate; maleates such as maleic acid, maleic anhydride and maleate esters. For convenience, these materials will be referred to as vinyl chloride polymers.

Vinyl chloride polymers may be either "rigid" or "flexible". Rigid polymer formulations may include impact modifiers, pigments and/or fillers, lubricants, etc. in addition to the resin and stabilizer. Flexible polymer compositions include a plasticizer and optionally pigments and/or fillers, and lubricants in addition to the resin and stabilizer.

The first component of the organotin stabilizer compositions of this invention is a derivative of a mercaptan, mercapto acid or mercapto acid ester. The first component stabilizers are represented by the generic formulae

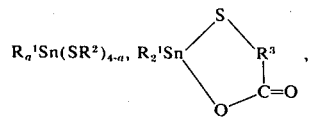

or the polymeric form

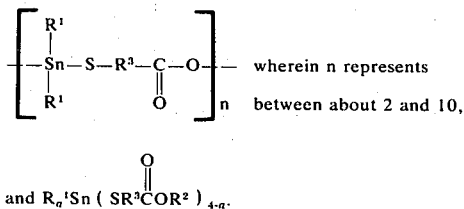 wherein n represents between about 2 and 10, and $R_a{}^1Sn(SR^3\overset{O}{\underset{\|}{C}}OR^2)_{4-a}$.

In these compounds $R^1$ and $R^2$ represent hydrocarbon radicals individually selected from the group consisting of alkyl, cycloalkyl, aralkyl, aryl, alkaryl, including such radicals when inertly substituted. When $R^1$ and $R^2$ are alkyl, they may typically contain between 1 and 20 carbon atoms in a linear or branched chain, including methyl, ethyl, n-propyl, isopropyl, n-butyl, isobutyl, sec-butyl, tert-butyl, n-amyl, neopentyl, isoamyl, n-hexyl, isohexyl, heptyls, octyls, decyls, dodecyls, tetradecyl and octadecyl. Preferred alkyl radicals contain fewer than about 8 carbon atoms, i.e., octyls and lower. When $R^1$ and $R^2$ are cycloalkyl, they may typically be cyclopentyl, cyclohexyl, cycloheptyl, or cyclooctyl. When $R^1$ and $R^2$ are aralkyl, they may typically be benzyl, β-phenylethyl, γ-phenylpropyl or β-phenylpropyl. When $R^1$ and $R^2$ are aryl, they may typically be phenyl or naphthyl. When $R^1$ and $R^2$ are alkaryl, they may typically be tolyl, xylyl, p-ethylphenyl or p-nonylphenyl. $R^1$ and $R^2$ may be inertly substituted in that they may bear non-reactive substituents such as alkyl, aryl, cycloalkyl, aralkyl, alkaryl, ether, etc. Typical substituted aryl radicals include anisyl and biphenyl. Inertly substituted aralkyl includes chlorobenzyl, p-phenylbenzyl and p-methylbenzyl. Inertly substituted alkaryl includes 2,6-di-tert-butyl-4-methylphenyl. The subscript a represents the integer 1 or 2 and $R^3$ represents a methylene or ethylene radical.

When the sulfur-containing radical bonded to the tin atom is a mercapto acid residue, i.e.

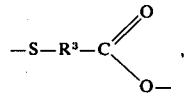

the sulfur and oxygen atoms may be bonded to the same tin atom, thereby forming a cyclic structure. Alternatively, the compound can exist as a telomer or polymer wherein the sulfur and oxygen atoms are bonded to different tin atoms.

Preferred first component stabilizers include:
dibutyltin bis(lauryl mercaptide)
butyltin tris(lauryl mercaptide)
dibutyltin bis(octyl mercaptide)
dibutyltin bis(benzyl mercaptide)
diphenyltin bis(octyl mercaptide)
dibutyltin bis(xylyl mercaptide)
dibutyltin-S,O-mercaptoacetate(cyclic and polymeric forms)
octyltin tris(isooctyl mercaptoacetate)
dibutyltin bis(cyclohexyl mercaptide)
octyltin tris(decyl mercaptide)
dibutyltin bis(phenyl mercaptide)
dioctyltin bis(lauryl mercaptide)
dioctyltin bis(octyl mercaptide)
dioctyltin bis(benzyl mercaptide)
dioctyltin-α, α'-dimercapto-p-xylene
dioctyltin bis(cyclohexyl mercaptide)
dicyclohexyltin bis(lauryl mercaptide)
dimethyltin bis(lauryl mercaptide)
dimethyltin bis(benzyl mercaptide)
dimethyltin bis(cyclohexyl mercaptide)
dimethyltin-α,α'-dimercapto-p-xylene
dibutyltin β-mercapto propionate (including polymers thereof)
dioctyltin β-mercaptopropionate (including polymers thereof)
dibutyltin bis(isooctyl mercaptoacetate)
dioctyltin bis(isooctyl mercaptoacetate)
dicyclohexyltin bis(isooctyl mercaptoacetate)
dimethyltin bis(isooctyl mercaptoacetate)
diphenyltin bis(isooctyl mercaptoacetate)
dibutyltin bis(lauryl mercaptoacetate)
dibutyltin bis(benzyl mercaptoacetate)
dibutyltin bis(cyclohexyl mercaptoacetate)

The second stabilizer, which constitutes between 20 and 80% by weight of the composition, exhibits a generic formula selected from

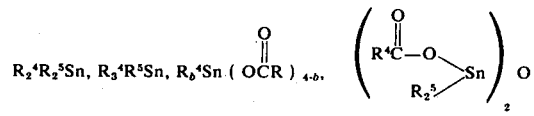

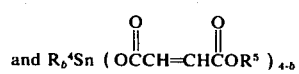

wherein $R^4$ and $R^5$ are different when directly bonded to the same tin atom and are individually selected from the same group as $R^1$ and $R^2$, and b is the integer 1, 2, or 3.

Preferred second stabilizers include:
triphenyl butyltin
dibutyl diphenyltin
dimethyl diphenyltin
dicyclohexyl diphenyltin
butyltin trioctanoate
diphenyltin dilaurate
bis(dibutyl lauryloxytin) -mercapto propionate
dibutyltin bis(isooctylmaleate)
bis(dibutyl decyloxytin) oxide The first and second stabilizers are present in amounts of between 0.1 and 10 parts by weight of 100 parts by weight of vinyl chloride polymer. Preferably the first stabilizer is used in the amount of 0.25 – 2 parts per 100 parts of polymer and the concentration of second stabilizer is between 0.2 and 2 parts.

The sulfur-containing organotin compound constitutes between 20 and 80% by weight of the total stabilizer, preferably between 33 and 67%.

The novel stabilized polymer compositions of this invention can be formulated by such techniques as milling, dry blending, Banbury blending, or any other commonly employed formulating techniques.

One of the formulating methods which is particularly convenient involves the formation of a stabilizer composition containing the first stabilizer, the second stabilizer, and auxiliary additives. This stabilizer composition is later added to, and thoroughly mixed with the vinyl chloride polymer.

Whatever formulating technique is employed, it is desirable to completely and uniformly disperse the first stabilizer and the second stabilizer throughout the vinyl chloride polymer composition.

Because of the unique properties of the present stabilizers, it is possible to effect stabilization with lower quantities of the more expensive sulfur-containing stabilizer, thereby obtaining a more efficient system on a cost performance basis.

The following examples demonstrate the novel features of this invention and the unexpected and outstanding results which can be attained by practice of this invention. All parts are parts by weight unless otherwise indicated.

In these examples, the rigid vinyl chloride polymer employed was that having a specific gravity of 1.40, a Shore Durometer "D" hardness of 80 and an ultimate tensile strength of about 7,000 psi sold under the trademark Geon 103 EP (or equivalent).

The selected compositions were thoroughly blended by placing the polyvinyl chloride (PVC) on a two-roller differential speed mill which was oil-heated to a temperature of 175°C. together with the noted quantity of first and second stabilizers. The mixture was milled for about 5 minutes during which time a continuous band of the composition formed around one of the rollers. This band was cut and removed from the roller as a continuous sheet. Squares measuring 2.54 cm × 2.54 cm were cut from the sheet for heat stability testing.

The heat stability of the samples was evaluated by placing the samples in a circulating air oven regulated to maintain a temperature of 190° or 205°C. Samples were removed from the oven at periodic intervals and the color of each sample rated according to the following scale:

7 — clear, water white
6 — off-white
5 — slightest degree of yellowing
4 — definite yellow color
3 — deep yellow-brown color
2 — deep brown color
1 — dark brown to black color The duration of the heating period (in minutes) following which the samples first exhibited a color value of 3 or less was recorded as the heat stability value. It will be understood that in some instances the period during which a value of 3 was present did not coincide with one of the times at which the sample was observed. In these instances the elapsed time at which any color darker than that corresponding to a rating of 3 was first observed was recorded as the heat stability value.

The amounts of first and second stabilizers employed, the heat stability values and initial color ratings of the polymer samples evaluated are summarized in the following tables. All parts are by weight, based on 100 parts of polyvinyl chloride. The color rating corresponding to the elapsed time recorded as the heat stability value (H.S.V.) appears in parentheses following the heat stability value.

EXAMPLE 1

This example demonstrates that the present non-sulfur-containing organotin compounds can replace up to 67% of a commercially successful organotin stabilizer, dibutyltin-S,S'-bis(isooctyl mercaptoacetate), referred to as $Bu_2Sn(IOMA)_2$. The heat stability values of the non-sulfur-containing stabilizers alone and initial color ratings (I.C.R) of the samples made prior to the heat stability test are recorded in the accompanying table, together with the temperature of the oven employed to evaluate the samples.

| $Bu_2Sn(IOMA)_2$ (parts) | Second Stabilizer (parts) | Oven Temp. (°C.) | H.S.V. (color rating) | I.C.R. |
|---|---|---|---|---|
| none | none | 205 | 0 | 1 |
| 3.0 | none | 205 | 30(2) | 6 |
| 0 | dibutyl diphenyltin (3.0) | 205 | 10(3) | 4 |
| 1.0 | dibutyl diphenyltin (2.0) | 205 | 30(3) | 7 |
| 2.0 | dibutyl diphenyltin (1.0) | 205 | rating after 40 min.=4 | 7 |
| 0 | triphenyl octyltin(3.0) | 205 | 10(3) | 4 |
| 2.0 | triphenyl octyltin(1.0) | 205 | rating after 40 min.=4 | 7 |
| 2.0 | none | 190 | 75(3) | 7 |
| 1.0 | dibutyltin dilaurate(1.0) | 190 | 75(3) | 7 |
| 1.5 | dibutyltin dilaurate(1.5) | 190 | rating after 90 min.=3 | 7 |
| 0 | dibutyltin dilaurate(2.0) | 190 | 15(3) | 4 |
| 3.0 | none | 205 | 30(2) | 6 |
| 0 | butyltin trioctanoate(2.0) | 205 | 15(3) | 4 |
| 1.0 | butyltin trioctanoate(0.5) | 205 | 75(3) | 7 |
| 0 | butyltin | | | |

-continued

| $Bu_2Sn(IOMA)_2$ (parts) | Second Stabilizer (parts) | Oven Temp. (°C.) | H.S.V. (color rating) | I.C.R. |
|---|---|---|---|---|
|  | trilaurate(1.5) | 190 | 0(3) | 3 |
| 1.5 | none | 190 | 60(2) | 6 |
| 1.0 | butyltin trilaurate(0.5) | 205 | 75(3) | 7 |
| 0 | bis(dibutyl lauryloxytin) oxide (2.0)[1] | 190 | 0(3) | 3 |
| 1.0 | same (0.5) | 190 | 60(3) | 7 |

[1]Formulation included 0.1 part 2,6-di-t-butyl-p-cresol as an antioxidant

The highest heat stability value that can be achieved with the foregoing second stabilizers in the absence of the sulfur-containing organotin compound is 15 minutes(color rating of 3) using 2 parts of butyltin trioctanoate per 100 parts of polyvinyl chloride. This value is one half that exhibited for a formulation containing 3 parts of the sulfur-containing stabilizer. It is therefore surprising that by replacing 33% of the sulfur-containing compound with butyltin trioctanoate and decreasing the total stabilizer content to 1.5 parts, the heat stability of the resultant formulation is actually superior to that exhibited by 3.0 parts of the sulfur-containing stabilizer.

EXAMPLE 2

This example demonstrates that heat stability is not maintained or increased when the present non-sulfur-containing organotin compounds are partially replaced by a symmetrical tetraorganotin compound. The sulfur-containing organotin compounds employed were dibutyltin-S,S'-bis(isooctyl mercaptoacetate), represented by $Bu_2Sn(IOMA)_2$, and dibutyltin-S,O-$\beta$-mercaptopropionate, represented by $Bu_2SnMP$. The second component of the stabilizer composition was tetrabutyltin ($Bu_4Sn$) or tetraphenyltin ($Ph_4Sn$) and the oven temperature was 205°C.

| S-contg. compound(parts) | Second Stabilizer(parts) | H.S.V. (color rating) | I.C.R. |
|---|---|---|---|
| none | $Bu_4Sn(3.0)$ | 10(3) | 4 |
| none | $Ph_4Sn(3.0)$ | 0(3) | 3 |
| $Bu_2Sn(IOMA)_2(3)$ | none | 30(2) | 6 |
| $Bu_2Sn(IOMA)_2(1.5)$ | $Bu_4Sn(1.5)$ | 25(3) | 7 |
| $Bu_2Sn(IOMA)_2(1.5)$ | $Ph_4Sn(1.5)$ | 15(3) | 7 |

Neither of the combinations using $Bu_2Sn(IOMA)_2$ achieved a heat stability value equivalent to that of the sulfur-containing stabilizer at a level of 3 parts by weight.

| S-contg. compound(parts) | Second Stabilizer(parts) | H.S.V. (color rating) | I.C.R. |
|---|---|---|---|
| $Bu_2SnMP(1.5)$ | none | 75(2) | 7 |
| $Bu_2SnMP(1.0)$ | $Bu_4Sn(0.5)$ | 60(3) | 7 |

From these data it is evident that symmetrical tetraorganotin compounds are not suitable partial replacements for sulfur-containing organotin stabilizers.

EXAMPLE 3

This example demonstrates that the present classes of non-sulfur-containing organotin compounds can partially replace a variety of known effective organotin stabilizers without reducing the resistance to heat induced discoloration imparted to polyvinyl chloride by the sulfur-containing stabilizer.

| S-contg. stabilizer(parts) | Second Stabilizer (parts) | Oven Temp. (°C.) | H.S.V. (color rating) | I.C.R. |
|---|---|---|---|---|
| $Bu_2SnMP(1.5)$[1] | none | 205 | 75(2) | 7 |
| $Bu_2SnMP(1.0)$ | BuSn trioctanoate (0.5) | 205 | 90(3) | 7 |
| $Bu_2SnMP(1.0)$ | dibutyl diphenyltin (0.5) | 205 | 75(2) | 7 |
| $Bu_2SnMP(1.0)$ | bis(dibutyl lauryloxytin) oxide (0.5) | 205 | 75(2) | 7 |
| $Bu_2SnMP(1.3)$ | dibutyltin dilaurate(0.2) | 190 | 75(3) | 7 |
| $Bu_2SnMP(1.5)$ | none | 190 | 75(3) | 7 |
| $BuSn(IOMA)_3$[2](3.0) | none | 190 | 30(3+) | 6 |
| $BuSn(IOMA)_3(1.0)$ | dibutyltin dilaurate (2.0) | 190 | 45(3+) | 7 |
| Dibutyltin bis (lauryl mercaptide)(1.5) | none | 205 | 45(3) | 5 |
| same (1.0) | dibutyl diphenyltin (0.5) | 205 | 45(3) | 5 |
| same (1.0) | bis(dibutyl lauryloxytin) oxide (0.5) | 205 | 45(3) | 6 |
| same(1.0) | dibutyltin bis (cyclohexyl | 205 | 60(1) | 7 |

| S-contg. stabilizer(parts) | Second Stabilizer (parts) | Oven Temp. (°C.) | H.S.V. (color rating) | I.C.R. |
| --- | --- | --- | --- | --- |
| | maleate)$_2$ (0.5) | | | |
| Dibutyltin bis (lauryl mercaptide) (0.75) | Bu$_2$Sn bis (isooctyl maleate)(1.75) | 190 | 60(3) | 6+ |
| same (1.0) | Tetrabutyltin (control) | 205 | 45(1) | 5 |

[1]Refer to Ex. 2
[2]butyltin-S,S′,S″-tris(isooctyl mercaptoacetate)

In contrast to the other non-sulfur containing organotin compounds, tetrabutyl tin is not a suitable replacement for dibutyltin-bis(lauryl mercaptide). This was also demonstrated in the previous Example 2.

| S-containing stabilizer(parts) | Second Stabilizer (parts) | Oven Temp. (°C.) | H.S.V. (color rating) | I.C.R. |
| --- | --- | --- | --- | --- |
| Oct$_2$Sn(IOMA)$_2$[3] (2.0) | none | 190 | 60(2) | 7 |
| same (1.5) | butyltin trioctanoate(0.5) | 205 | 60(3) | 7 |
| same (1.5) | dioctyltin dilaurate(0.5) | 190 | 60(3) | 7 |
| same (1.0) | same | 190 | 60(3) | 7 |

[3]dioctyltin-S,S′-bis(isooctyl mercaptoacetate)

EXAMPLE 4

This example demonstrates that the level of heat stability imparted to polyvinyl chloride resin by the present two-component stabilizers is not significantly improved by the presence of a conventional antioxidant, 2,6-di-t-butyl-p-cresol.

| First Stabilizer (parts) | Second Stabilizer (parts) | Anti-Oxidant (Parts) | Oven Temp. (°C.) | H.S.V. (color rating) | I.C.R. |
| --- | --- | --- | --- | --- | --- |
| Bu$_2$Sn(IOMA)$_2$[4] (2.0) | none | none | 190 | 75(3) | 7 |
| same (2.0) | none | 0.1 | 190 | 60(3) | 7 |
| same (1.0) | BuSn trilaurate(0.5) | 0.1 | 190 | 75(2) | 7 |
| none | same (1.5) | 0.1 | 190 | 0(3) | 3 |
| none | same (1.5) | none | 190 | 0(3) | 3 |
| Bu$_2$Sn(IOMA)$_2$ (1.5) | dibutyl diphenyltin (0.3) | none | 190 | 30(3) | 7 |
| same | same | 0.2 | 190 | 30(3) | 7 |

[4]refer to Ex. 1

The heat stability values for some of the foregoing second stabilizers used alone are reported in Example 1.

The sulfur-containing stabilizer represented in the following table is dibutyltin-S,O-mercaptoacetate.

| S-contg. Stabilizer (parts) | Second Stabilizer (parts) | Oven Temp. (°C.) | H.S.V. (color rating) | I.C.R. |
| --- | --- | --- | --- | --- |
| 1.5 | none | 205 | 45(3) | 7 |
| 1.0 | dibutyl diphenyltin(0.5) | 205 | 45(3) | 7 |
| 1.0 | bis(dibutyl lauryloxytin) oxide (0.5) | 205 | 45(3) | 7 |
| 1.0 | dibutyltin dilaurate(0.5) | 205 | 45(3) | 7 |
| 1.0 | dibutyltin bis (cyclohexyl maleate)(0.5) | 205 | 60(3) | 7 |

All of the foregoing data demonstrate that the heat stability imparted to vinyl chloride polymers is maintained or improved by partial placement of the present sulfur-containing stabilizers with certain non-sulfur-containing organotin compounds, despite the fact that the latter are relatively ineffective heat stabilizers for vinyl chloride polymers.

What is claimed is:

1. An improved two-component heat stabilizer for vinyl chloride polymers, said stabilizer consisting essentially of a sulfur-containing organotin compound and a non-sulfur-containing organotin compound, the weight ratio of the sulfur-containing compound to the non-sulfur-containing compound being between 4:1 and 1:4, respectively, wherein the sulfur-containing organotin compound exhibits a formula selected

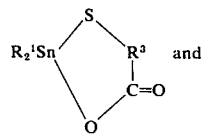

and

and the non-sulfur-containing organotin compound exhibits a formula selected from the group consisting of $R_2^4R_2^5Sn$, $R_3^4R^5Sn$ and

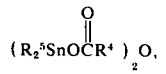

wherein $R^1$ and $R^2$ are individually selected from the group consisting of alkyl radicals containing between 1 and 20 carbon atoms, cycloalkyl, aryl, alkaryl and aralkyl radicals, $R^3$ is a methylene or ethylene radical, $R^4$ and $R^5$ are selected from the same group as $R^1$, with the proviso that $R^4$ and $R^5$ are not identical when both are bonded directly to a tin atom and a represents the integer 1 or 2.

2. The improved two-component heat stabilizer of claim 1 wherein the non-sulfur-containing organotin compound is selected from the group consisting of tetraorganotin compounds of the general formulae $R_2^4R_2^5Sn$ and $R_3^4R^5Sn$ wherein $R^4$ is butyl or octyl and $R^5$ is phenyl.

3. The improved two-component heat stabilizer of claim 1 wherein the weight ratio of sulfur-containing organotin compound to non-sulfur-containing organotin compound is between 2:1 and 1:2 respectively.

4. An improved heat stabilized vinyl chloride polymer composition wherein the polymer is selected from the group consisting of vinyl chloride homopolymers and copolymers of vinyl chloride with up to 50 mole percent, based on total monomers, of an ethylenically unsaturated monomer that is copolymerizable with vinyl chloride, said composition containing between 0.2 and 20 parts per 100 parts by weight of vinyl chloride polymer, of a stabilizer consisting essentially of a sulfur-containing organotin compound and a non-sulfur containing organotin compound, the weight ratio of the sulfur-containing organotin compound to the non-sulfur-containing organotin compound being between 4:1 and 1:4, respectively, wherein the sulfur-containing organotin compound exhibits a formula selected from the group consisting of $R_a{}^1Sn(SR^2)_{4-a}$,

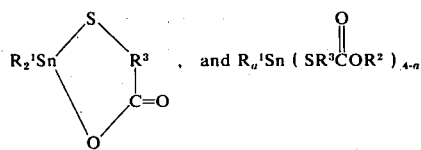, and $R_a{}^1Sn(SR^3COR^2)_{4-a}$ and the non-sulfur-containing organotin compound exhibits a formula selected from the group consisting of $R_2{}^4R_2{}^5Sn$, $R_3{}^4R^5Sn$ and

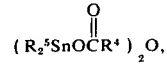

wherein $R^1$ and $R^2$ are individually selected from the group consisting of alkyl radicals containing between 1 and 20 carbon atoms, cycloalkyl, aryl, alkaryl and aralkyl radicals, $R^3$ is a methylene or ethylene radical, $R^4$ and $R^5$ are selected from the same group as $R^1$, with the proviso that $R^4$ and $R^5$ are not identical when both are bonded directly to a tin atom and a represents the integer 1 or 2.

5. The improved heat stabilized vinyl chloride polymer composition of claim 4 wherein the non-sulfur-containing organotin compound is selected from the group consisting of tetraorganotin compounds of the general formulae $R_2{}^4R_2{}^5Sn$ and $R_3{}^4R^5Sn$ wherein $R^4$ is butyl or octyl and $R^5$ is phenyl.

6. The improved heat stabilized vinyl chloride polymer composition of claim 4 wherein the weight ratio of sulfur-containing organotin compound to non-sulfur-containing organotin compound is between 2:1 and 1:2 respectively, and the total stabilizer concentration is between 1.5 and 3 parts by weight per 100 parts of vinyl chloride polymer.

* * * * *

UNITED STATES PATENT OFFICE
CERTIFICATE OF CORRECTION

Patent No. 3,933,741      Dated 1/20/76

Inventor(s) William A. Larkin et al.

It is certified that error appears in the above-identified patent and that said Letters Patent are hereby corrected as shown below:

Claim 1 - Formula is incorrect. Should read $$R^1_\alpha Sn(SR^3C{\overset{O}{\underset{OR^2}{}}})_{4-\alpha}$$

Signed and Sealed this twenty-ninth Day of June 1976

[SEAL]

Attest:

RUTH C. MASON  
Attesting Officer

C. MARSHALL DANN  
Commissioner of Patents and Trademarks